May 11, 1965  B. BOTAR  3,182,923

SEAT BELT REEL MECHANISM

Filed May 15, 1963  3 Sheets-Sheet 1

INVENTOR.
BELA BOTAR
BY BLUM, MOSCOVITZ, FRIEDMAN,
BLUM & KAPLAN
ATTORNEY

INVENTOR.
*BELA BOTAR*

BY Blum, Moscovitz,
Friedman, Blum & Kaplan
ATTORNEYS

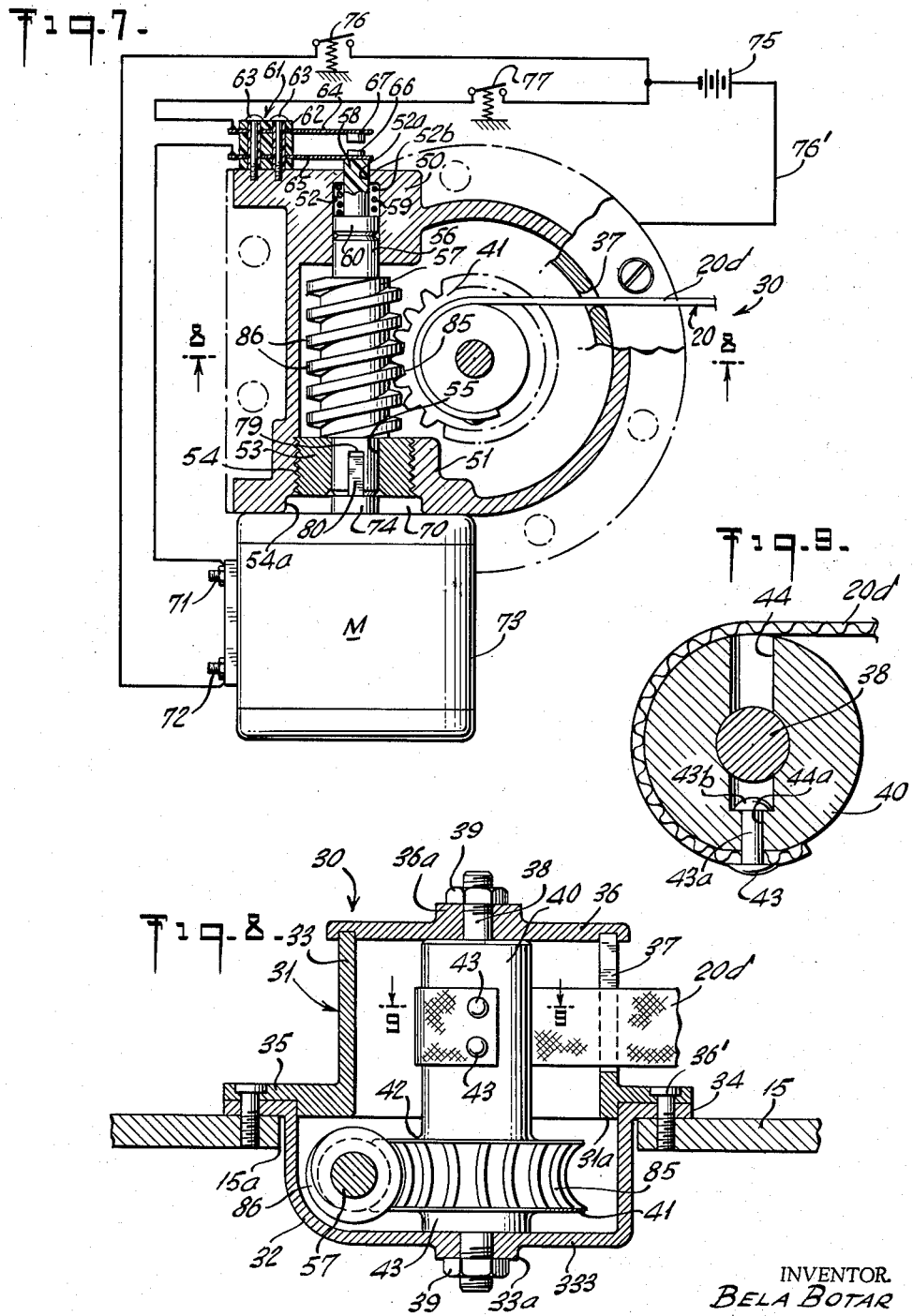

United States Patent Office 3,182,923
Patented May 11, 1965

3,182,923
SEAT BELT REEL MECHANISM
Bela Botar, 51—36 65th Place, Woodside 77, N.Y.
Filed May 15, 1963, Ser. No. 280,561
1 Claim. (Cl. 242—55)

This invention relates to an improved seat belt mechanism for automobiles and the like, and in particular relates to an improved seat belt mechanism having a motor driven wheel for both loosening and tightening the belt.

This invention is an improvement over the mechanism shown in my prior U.S. Patent No. 3,022,089.

My prior patent shows a structure whereby the seat belt may be normally attached loosely to the dashboard so that it does not interfere in any way with the normal movements of the passengers. In accordance with my patent, when an emergency occurs, a switch is closed, for example, by extra force exerted upon the brakes, thereby energizing an electric motor driven reel mechanism which automatically draws the belt tightly about the occupant of the seat. In accordance with my prior patent, the drive mechanism for the reel includes a clutch. Also, it is necessary for the occupant manually to unreel the belt in order to permit it to be replaced upon the dashboard.

One object of this invention is to provide an improved motor driven reel, which can be effective both to tighten and to loosen the seat belt.

Another object of this invention is to provide a motor driven clutchless reel mechanism for both tightening and loosening the seat belt, wherein the parts of the drive train are always operatively engaged.

Another object of the invention is to provide a seat belt reel mechanism in a casing and operated by a motor for both reeling and unreeling, and having means for preventing slack in the belt controlled by exertion of tension on the belt, so as to prevent snarling of the belt in the casing.

Another object of this invention is to provide a motor driven reel which is effective for unreeling or loosening the belt only when the occupant exerts tension upon the belt.

Another object of the invention is to provide a reversible motor driven seat belt reel which is economical to manufacture, fast acting, foolproof, durable and easy to install.

In accordance with preferred embodiments of the invention, one or both ends of the belt may be attached to a reeling and unreeling mechanism, or one end of the belt may be fixedly anchored. Also in accordance with the invention, the seat belt may be mounted upon the dashboard as in my prior patent, or may be secured around the seat occupant in conventional manner. In either instance, the reel mechanism includes a reversible motor having a rotary output shaft coupled by a spline to a shaft having a worm mounted thereon, such that the worm has limited axial sliding movement while remaining drivingly coupled to the motor shaft. The worm in turn drives a worm wheel mounted upon a shaft upon which the reel proper is also mounted. The end of the belt is secured to the reel. A spring biases the worm shaft toward the motor shaft.

The motor may conveniently have independent windings for each direction of turning thereof, and each of these windings is coupled through an independent switch to a source of electric power. The switch for the reeling direction of the motor, which turns the worm in direction to wind the belt upon the reel, may be manual, controlled by the foot brake, or otherwise in accordance with my aforesaid prior patent. The switch for the other winding may conveniently be mounted upon a dashboard.

As an important feature of the invention, the circuit for the unreeling winding includes a further switch which is controlled by the axial position of the worm shaft. In the normal position of the worm shaft, such further switch is open, and the reeling winding is unenergized. When tension is exerted upon the seat belt in unreeling direction, the resulting turning movement of the worm wheel acts upon the worm so as to move it axially against the biasing force, as a result of which the further switch is closed. Provided that the dashboard switch is also closed, the unreeling winding is then energized, and the belt is unreeled. However, as soon as the occupant relaxes the tension upon the belt, the unreeling stops.

The provision of such further switch ensures against unwanted slack in the seat belt, while at the same time making it unnecessary to exert manual force to loosen the seat belt. This is convenient even if the seat belt is worn across the lap, and is especially convenient if the seat belt has to be returned to position against the dashboard.

Other objects and advantages of the invention will become apparent from the following description, in conjunction with the annexed drawing, in which preferred embodiments of the invention are disclosed.

In the drawing,

FIG. 7 is a horizontal section, partly in elevation and partly broken away, of the improved motor driven reel mechanism in accordance with the invention.

FIG. 8 is a section on line 8—8 of FIG. 7.

FIG. 9 is a fragmentary section on line 9—9 of FIG. 8.

Figure 1:
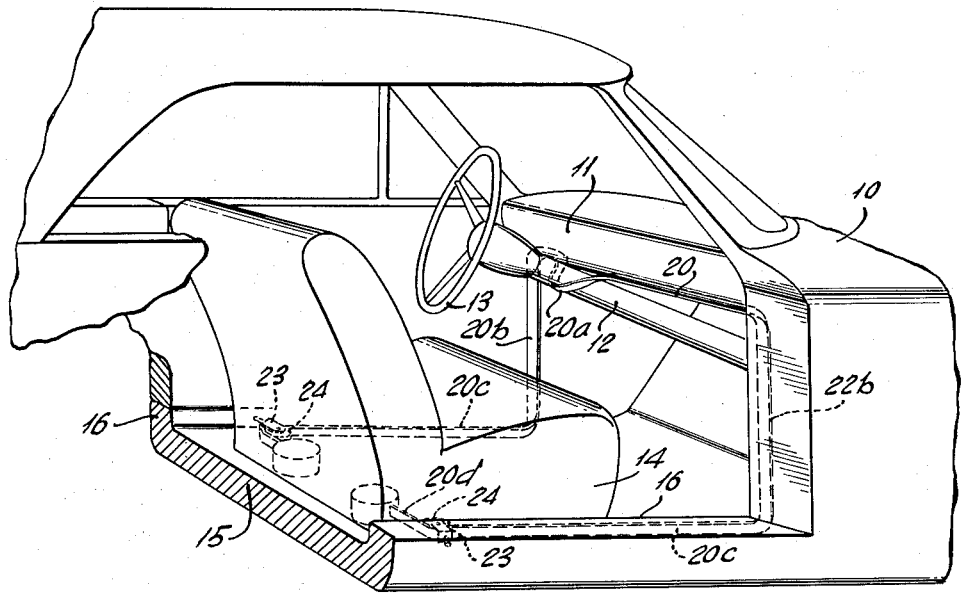
FIG. 1 is a simplified, broken away, perspective view of an automobile, showing one embodiment of a seat belt and reel mechanism in accordance with this invention. This shows a single belt for the entire front seat of an automobile, mounted upon the dashboard.

Upon reference to the drawing in detail, it will be noted that it shows an automobile 10 of conventional nature which need not be described in detail. The automobile 10 has a dashboard 11 and a steering column 12 under the dashboard 11 and carrying the usual steering wheel 13. Automobile 10 further has a front seat 14 with back 14a resting upon floor 15, and side sills 16 on each side of the floor 15.

Figure 2:
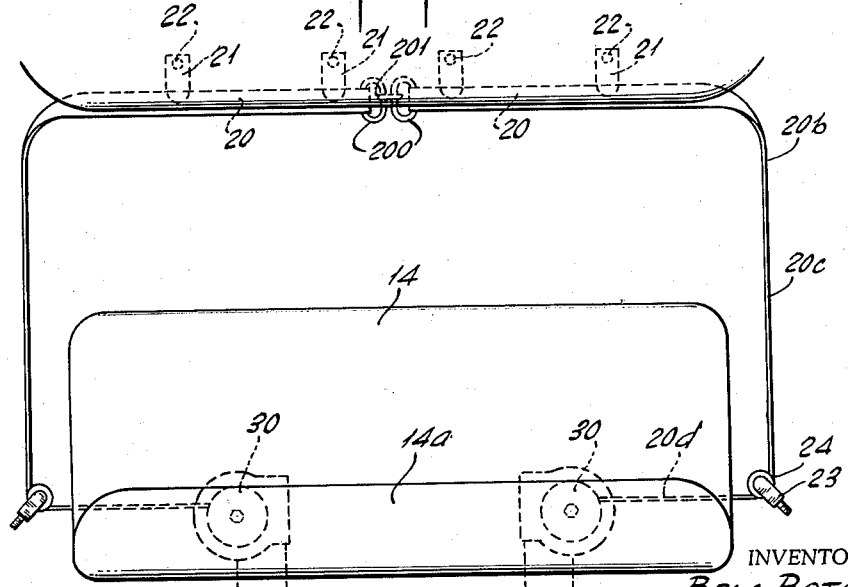
FIG. 2 is a plan view of the mechanism shown in FIG. 1.

FIGS. 1 and 2 show a seat belt 20 extending across dashboard 11 and looped at 20a under steering column 12. As described in my aforesaid prior patent, the safety belt itself comprises two belt sections 20 in lateral alignment. Each of these sections 20 is secured under dashboard 11 by means of clips 21, two such clips 21 being shown for each seat belt section 20. Each said clip 21 is secured by a stud 22 to the underside of dashboard 11 and may be of any suitable resilient construction so as to hold the seat belt releasably against the underside of dashboard 11. The two seat belt sections 20 terminate at their inner ends in rings 200 which are releasably secured together by clasp 201. Optionally, a single seat belt may be substituted for the two sections 20.

Figure 5:
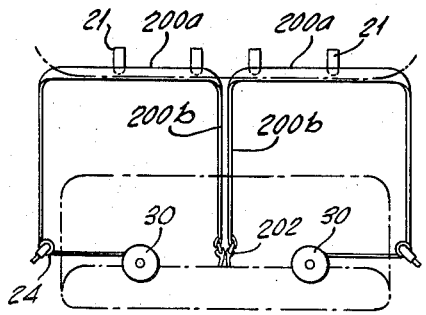
FIG. 5 is a diagrammatic plan view of a second embodiment of the invention, in which there are two separate seat belts, shown in unreeled or loose position.
Figure 6:
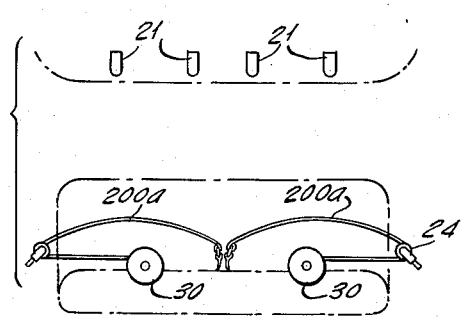
FIG. 6 is a view similar to FIG. 5, showing the seat belts in tight or reeled position.

The belt is further extended, at each side of the dashboard, downwardly at 20b to the floor, and is then extended rearwardly along the floor next to sill 16, as designated by the reference numeral 20c. Similarly to my prior patent, a pulley bracket 23 is secured to the sill 16 adjacent seat 14 and supports a pulley 24 for rotation about a vertical axis. The belt 20c extends frictionally around pulley 24 and then laterally inwardly at 20d, under seat 14, adjacent back 14a, and hence into the reel mechanism 30 under the seat. In this embodiment, two reel mechanisms 30 are shown, one for each end of the belt, the details of the reel mechanism 30 being shown in FIGS. 7, 8 and 9. However, it will be apparent that one end of the belt may be fixedly anchored, as shown in FIGS. 5 and 6. Only the righthand reel mechanism of FIG. 2 will be described in detail, but it will be apparent that the principles of construction of the lefthand reel mechanism will be the same.

Figure 3:
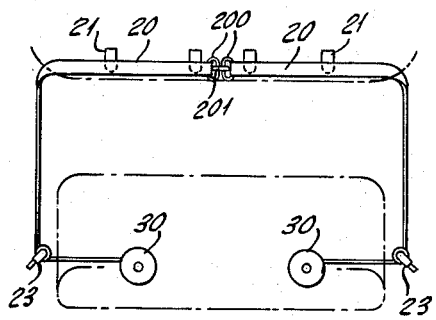
FIG. 3 is a view similar to FIG. 2, but diagrammatic and to reduced scale, showing the belt unreeled or loose.
Figure 4:
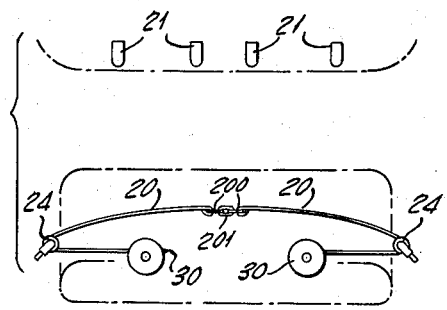
FIG. 4 is a view similar to FIG. 3, showing the seat belt in tight or reeled position.

FIG. 3 shows the two joined seat belt sections 20 in unreeled position on the dashboard. FIG. 4 shows the two joined seat belt sections 20 in reeled position, corresponding to appropriate actuation of the reel mechanisms 30.

FIG. 5 shows two independent seat belts 200a, each having an inner portion 200b attached by anchor 202 to the floor inwardly of the associated reel mechanism 30. FIG. 5 shows the unreeled condition of belts 200a, and FIG. 6 shows them in reeled position.

It will be apparent that the invention is not limited to the above arrangements and other suitable arrangements may be employed. Furthermore, in accordance with the invention, it is possible for the occupant to wear the seat belt around the lap rather than mounted upon the dashboard. The action of the reeling mechanism is the same in either instance.

*The reel mechanism*

As indicated above, this is shown in detail in FIGS. 7, 8 and 9. As shown in these views, the reel mechanism 30 has a casing 31 which has a lower casing portion 32 and an upper casing portion 33. The lower casing portion 32 is generally round and has a bottom wall 333 and a top, outwardly extending, transverse peripheral flange 34. Casing 32 extends through hole 15a in floor 15, with flange 34 resting upon the top of floor 15.

The upper casing 33 is also generally round and has a bottom, outwardly extending, transverse peripheral flange 35 which overlies flange 34. A portion of the casing peripheral wall, designated by reference numeral 31a, extends below flange 35 and is interfitted into the peripheral wall of casing 32. A plurality of bolts 36' extend through flange 35, in which they are optionally countersunk, as well as through flange 34, and are screwed into floor 15.

The upper end of casing 33 is closed by cover 36. The peripheral wall of casing 33 has a vertical slot 37 extending slightly above flange 35 to the top of the casing, this slot 37 being located on the right side in the case of the right side unit being described in detail. The belt portion 20d enters the casing through slot 37.

Reel shaft 38 extends vertically through the casing and also extends through boss 33a on bottom wall 333 and boss 36a on top cover 36. The ends of shaft 38 are threaded, and nuts 39 are screwed onto shaft 38 above and below the respective bosses 36a and 33a, to secure shaft 38 in place. Reel 40 and worm wheel 41 are turnably mounted upon shaft 38, with reel 40 above worm wheel 41. Preferably, reel 40 and worm wheel 41 are integral, either by being formed in one piece or by being welded together as shown at 42. Worm wheel 41 is of greater diameter than reel 40 and optionally has a bottom hub 43 adjacent bottom wall 333. In any event, the reel 40 and worm wheel 41 join together for rotation as a unit about a vertical axis.

The free belt end from belt portion 20d within the casing is extended around reel 40 and secured thereto by rivets 43. Optionally, reel 40 has a diametrical bore 44 extending from one side thereof, past the center, to a point at which it is reduced in diameter at 44a to the other side of the reel. Prior to mounting reel 40 upon shaft 38, the shank 43a of rivet 43 is extended through a hole in belt end portion 20d and is extended through bore 44a and into the main bore 44, within which a tool is inserted so as to form the second head 43b.

To the left side of reel 41, the peripheral wall of casing 32 is formed with opposed front boss 50 and rear boss 51, these bosses opposing each other horizontally. Appropriate sleeve bearings are formed in bosses 50 and 51 to receive the horizontally extending worm shaft. Specifically, boss 50 is formed with a bearing bore 52 extending from the rear face thereof to near the front thereof, at which point it is reduced in diameter at 52a and continued to the front face of boss 50. A shoulder 52b is formed at the junction between boss 52 and boss 52a. Boss 51 is formed with a threaded bore 54 extending from its front face to near its rear, at which it is enlarged at 54a to extend to the rear face of the boss. An externally threaded insert 53 is screwed into bore 54 and has a central through bore 55. Bores 55 and 52 are aligned and extend longitudinally.

Worm shaft 56 is slidably and turnably received within the bores 52 and 55 and extends across the casing. Worm 57 is formed on shaft 56 and may optionally be integral therewith. Worm 57 meshes drivingly with worm wheel 41. The length of worm 57 is less than the distance between bosses 50 and 51.

Insulating rod 58 extends slidably through bore 52a and into bore 52, and also extends forwardly of the front face of boss 50. Coil spring 59 in bore 52 surrounds rod 58 and abuts shoulder 52b. Bushing collar 60 receives the rear end of rod 58 and is slidably received within bore 52 between the end of insulating rod 58 and worm shaft 56. Spring 59 bears against a bushing 60 and biases it rearwardly. Spring 59 thereby also biases insulating rod 58 and worm 57 rearwardly. On the other hand, forward movement of worm shaft 56 moves insulating rod 58 forwardly out of boss 50.

A conventional, normally open switch 61 is mounted upon the front face of boss 50. Switch 61 includes an insulating block 62 laterally offset from rod 58 and secured by longitudinal screws 63 to boss 50. Switch 61 also includes front metal contact arm 64 and rear metal contact arm 65 extending laterally through block 62 and to both sides thereof. The arms 64 and 65 extend to a greater extent to the right of block 62 and are normally parallel to each other, and carry facing and normally spaced contacts 67 and 66 respectively. These contacts are adjacent the free ends of the arms 65 and 64 and also are longitudinally aligned with insulating rod 58. When insulating rod 58 is forced forwardly, it flexes the flexible spring arm 65 and carries contact 66 into electrical contact with contact 67 (closing switch 61), this contact being broken as the result of the biasing action of spring 59, when the forward force upon insulating rod 58 is released.

Motor M is mounted rearwardly of boss 51, the casing 73 of motor M having a front extension 70 which extends into bore 54a and abuts the insert 53. Motor M may be of any conventional type having separate electric windings (not shown) which may be selectively energized to turn the motor in either direction. Each of these windings is connected to an external motor terminal 71 and 72 respectively, the other end of each winding being grounded to the motor casing 73. Motor driven shaft 74 extends out of the front of casing 73, in alignment with worm shaft 56. When electric power is applied between terminal 71 and ground, the unreeling winding of motor M is energized: and when electric power is applied between terminal 72 and ground, the reeling winding of motor M is energized.

One terminal of battery 75 is connected through normally open switch 76 to terminal 72, and the other terminal of battery 75 is connected through line 76' to casing 33 which serves as common ground with motor casing 73. The ungrounded side of battery 75 is connected through normally open switch 77 to switch contact arm 64. Switch contact arm 65 is connected to terminal 71.

It will be apparent that when switch 76 is closed, electric power is applied to the reeling winding of motor M. When switch 77 and switch 61 are closed, electric power is applied to the unreeling winding of motor M.

Motor shaft 74 and worm shaft 56 are connected by a spline so as to permit motor shaft 74 to rotate worm shaft 56, while at the same time permitting axial movement of shaft 56. Specifically, a parallel sided slot 79 is formed in worm shaft 56 extending axially from the rear end thereof. The front end of motor shaft 74 has a corresponding flat extension 80 which fits slidably and nonrotatably in slot 79.

It will be apparent that the threads of worm 57 are pitched in such a way that when worm 57 is turned in the counterclockwise direction as viewed in FIG. 8, as the result of energization of the unreeling winding of motor M, worm wheel 41 is turned in the clockwise direction, as viewed in FIG. 7, and belt 20 is unreeled. Correspondingly, the energization of the reeling winding of motor M causes worm 57 to be turned in the opposite direction thereby causing belt 20 to be reeled upon reel 40. It will be apparent that if a pull is exerted upon belt 20, in the unreeling direction, thereby tending to turn worm wheel 41 in the clockwise direction, as viewed in FIG. 7, the worm wheel 41 cannot turn worm 57: and instead, worm wheel teeth 85 engage worm thread turns 86 and move worm 57 forwardly, against the action of spring 52, thereby closing the switch contacts 66 and 67 of switch 61. It will further be apparent that in that position of the worm, element 80 is still received within slot 79, so that the motor can continue to drive worm 57, for unreeling action.

*Summary of operation*

It will be assumed that to start, the belt is in loose position, either mounted upon the dashboard or loosely around the lap of the wearer. In the event of emergency conditions, switch 76 is closed, thereby energizing the reeling winding of the motor and reeling the belt tightly around the occupant of the seat. The reeling stops when the belt is sufficiently tight so that the power of the motor is insufficient to turn the worm wheel any further, or when switch 76 is opened. Switch 76 may be a manual switch on the dashboard, or may be operatively coupled to the foot brake for actuation by excess pressure upon the foot brake, as disclosed in my aforesaid prior U.S. patent. In any event, when the emergency is over, switch 76 is opened.

If it is desired then to unreel the belt, either to loose position on the lap, or to permit it to be releasably mounted upon the dashboard, switch 77 is closed. Optionally, switch 77 may be a spring switch mounted upon the dashboard or instrument panel. It is then necessary for the occupant to lean forward in his seat against the belt, or to exert tension upon the belt forwardly and away from him by means of the hand, so as to move worm 57 to position for closing switch 61. As a result of the closing of both switches 77 and 61, the unreeling winding of motor M is energized, and worm 57 is turned so as to turn worm wheel 41 in direction to unreel the belt from reel 40. If at any time the tension upon the belt is relaxed, spring 59 returns worm 57 to its normal position and also opens the contacts of switch 61, thereby stopping the unreeling action. Of course, the unreeling action can also be stopped by releasing the button of switch 77 so as to permit it to open. The switch 77 is needed, so that the unreeling action would not begin every time the occupant leans forward against the seat belt while in the car. On the other hand, the switch 77 alone is not adequate since it is then possible during the unreeling action to create slack in the belt. This would make it necessary to operate the reeling mechanism. Furthermore, the belt could become snarled in casing 31.

It will be apparent that numerous changes may be made in the reeling mechanism. For example, the casing may be changed considerably, and also the manner of mounting and orientation of the device may also be changed.

It will further be apparent that the reeling mechanism has application to devices other than seat belts, and in fact may be employed whenever a long length is wound upon a reel and is to be reeled and unreeled by a motor. Thus, if a long cable is wound upon the reel, then in the unwinding operation, the presence of switch 61 will prevent any slack and will permit the person unreeling the cable to control the unreeling operation from the leading end of the cable, at a point remote from the switch mechanisms themselves.

It will further be apparent that the switches 76 and 77 can be ordinary toggle switches rather than normally open switches. Furthermore, additional switches may be used. Thus, if switch 76 is controlled by the brake, it is conceivable that another switch on the dashboard might be connected in parallel with switch 76.

While I have disclosed preferred embodiments of my invention, and have indicated various possible changes, omissions and additions which may be made therein, it will be apparent that various other changes, omissions and additions may be made in the invention without departing from the scope and spirit thereof.

What is claimed is:

Seat belt mechanism comprising a reel shaft having an axis, a reel and a worm wheel mounted on said reel shaft so as to be rotatable in unison, a reversible electric motor having an output motor shaft having a motor shaft axis, means mounting said motor shaft with its axis transverse to and offset from the reel shaft axis, a worm shaft having a worm shaft axis, means mounting said worm shaft to be rotatable about its axis and axially slidable, said motor and worm shaft being opposingly and axially aligned and having cooperating spline means drivingly coupling said motor shaft to said worm shaft while permitting said axial sliding movement of said worm shaft, a worm fixedly mounted on said worm shaft and drivingly meshing with said worm wheel, means biasing said worm shaft in axial direction toward said motor shaft, a seat belt having one end wound on said reel, unreeling tension on said seat belt being operative by interaction of said worm wheel and said worm to move said worm shaft in the other axial direction thereof, said electric motor having a ground and a first input terminal corresponding to reeling action and second input terminal corresponding to unreeling action, a source of power having one side grounded, a normally open first switch connecting the other side of said power source to said first terminal, and a normally open second switch and normally open third switch in series connecting said other side of said voltage source to said second terminal, and means coupling said worm shaft and said third switch for closing said third switch by movement of said worm shaft in said one axial direction, said third switch comprising opposing contacts in line with the axis of said worm shaft, and spring means coupling said contacts and normally maintaining them spaced, one of said contacts positioned to be engaged by said worm shaft when moved in said one axial direction and thereby moved into operative engagement with the other contact.

References Cited by the Examiner

UNITED STATES PATENTS

| | | | |
|---|---|---|---|
| 2,496,890 | 2/50 | Peterson | 242—54 |
| 2,905,231 | 9/59 | Olson | 280—150 |
| 2,937,882 | 5/60 | Oppenheim | 280—150 |

FOREIGN PATENTS 113,400   7/41   Australia.

MERVIN STEIN, *Primary Examiner.*

DONALD W. PARKER, *Examiner.*